(12) United States Patent
Beaujot

(10) Patent No.: US 8,752,490 B2
(45) Date of Patent: Jun. 17, 2014

(54) SINGULATING SEED

(75) Inventor: Norbert Beaujot, Regina (SK)

(73) Assignee: Straw Track Manufacturing Inc., Saskatchewan (CA)

( * ) Notice: Subject to any disclaimer, the term of this patent is extended or adjusted under 35 U.S.C. 154(b) by 236 days.

(21) Appl. No.: 13/264,481

(22) PCT Filed: Mar. 22, 2010

(86) PCT No.: PCT/CA2010/000425
§ 371 (c)(1),
(2), (4) Date: Oct. 14, 2011

(87) PCT Pub. No.: WO2010/124360
PCT Pub. Date: Nov. 4, 2010

(65) Prior Publication Data
US 2012/0031315 A1  Feb. 9, 2012

(30) Foreign Application Priority Data
Apr. 29, 2009 (CA) .................................. 2665060
Nov. 4, 2009 (CA) .................................. 2684346

(51) Int. Cl.
A01C 7/12 (2006.01)
(52) U.S. Cl.
USPC ........................................................ 111/178

(58) Field of Classification Search
USPC .................................. 111/178, 177, 174, 170
See application file for complete search history.

(56) References Cited

U.S. PATENT DOCUMENTS
2008/0163807 A1  7/2008  Dean et al.

FOREIGN PATENT DOCUMENTS
DE     93 07 231.7    7/1993
GB     352162         7/1931

OTHER PUBLICATIONS
International Search Report for PCT/CA2010/000425, mailed Jul. 7, 2010.
Written Opinion of the International Searching Authority for PCT/CA2010/0004258, mailed Jul. 7, 2010.

Primary Examiner — Christopher J Novosad
(74) Attorney, Agent, or Firm — Nixon & Vanderhye P.C.

(57) ABSTRACT

A seed feeding apparatus includes a feed assembly with a V-shaped groove with at least one moving wall and a pocket formed by the walls of the groove and a pocket plate configured to substantially conform to the groove. The pocket plate is located such that the moving wall moves upward at the pocket. Seeds are received and form a pile in the pocket. As the moving wall moves, seeds fall from the pile to the bottom of the groove with sides of the seeds bearing against the walls of the groove such that the seeds are aligned in single file along the bottom of the groove and move upward over the upper edge of the groove and then fall out of the groove one at a time at a constant rate into a furrow.

14 Claims, 4 Drawing Sheets

SINGULATING SEED

This application is the U.S. national phase of International Application No. PCT/CA2010/000425, filed 22 Mar. 2010, which designated the U.S. and claims priority to Canada Application No. 2,665,060, filed 29 Apr. 2009; and Canada Application No. 2,684,346, filed 4 Nov. 2009, the entire contents of each of which are hereby incorporated by reference.

This invention is in the field of agricultural seeding implements and in particular systems that improve seed spacing uniformity.

BACKGROUND

Seeding implements typically include a seed supply system that takes seed from a storage container and conveys the seed to a furrow made in the ground surface by a furrow opener of the implement.

When seeding, it is desired to plant the seeds to obtain a selected plant population with a selected number of plants growing in a given area, such as X plants per square meter. In order to obtain this desired plant population, a seeding rate is determined, commonly in units of weight per given area, such as pounds per acre. For any seed variety, a pound of seed will contain approximately a known number of seeds. The number of seeds per pound will of course vary, depending on seed size, density of the seed, moisture content, and like variable characteristics of the sample compared to the seed standard, but for a great many seeds, typically small seeds such as wheat, barley, canola, using a rate in pounds per acre provides satisfactory plant populations.

The germination rate of the seed will also be determined to determine what percentage of the seeds being sown are viable and will grow into a plant. Such germination rates can vary considerably, and so where germination rate is lower, an increased application rate will be required.

Ideally, the plants will be evenly distributed along the furrow so that each plant has the same optimum space for growth. Evenly spaced plants provide maximum yields, and mature evenly. Uneven spacing also wastes seed, which is becoming increasingly expensive. The benefits of along-the-row seed separation uniformity are well known and practiced on row crop planters for crops such as corn and sunflowers, where singulator mechanisms have been developed to drop seeds into a furrow one at a time at constant intervals in order to provide uniform seed spacing in the furrow.

Such row crop planters typically plant fairly widely spaced parallel rows of seed, for example 24 inches or 36 inches apart. Conventional row crop planters have typically included a number of spaced apart seeding assemblies, each with a storage container to carry seed, and a furrow opener. A singulator type metering device at the bottom of the storage container takes seeds one at a time and drops them into the furrow created by the furrow opener.

In conventional solid seeding implement, the row spacing is much reduced, typically 6-12 inches between rows. Conventionally a single container extends across the width of the seeder above the furrow openers, and metering devices, such as a rotating feed wheels, are provided in the bottom of the container above each furrow opener to meter seed from the container to the furrow opener.

While it is contemplated that many solid seeded crops could also benefit from increased uniformity of seed spacing, the rows are much closer together and providing conventional singulating technology, which often include vacuum pick ups, on each furrow opener would be too complex and too expensive to be warranted. These conventional singulating systems are quite time consuming to adjust and to clean out when changing seeds and also do not readily adapt to a variety of seed sizes and spacing requirements that are encountered in solid seeded crops where seeds can be quite large as in wheat seeded at 100 pounds per acre, or quite small as in canola seeded at 4 pounds per acre.

Air seeders have become increasingly popular for all kinds of seeding. In air seeders, the seed is stored in a central bulk tank and then carried by an air stream to furrows made by furrow openers of the air seeder. In the majority of conventional air seeders, typically used for solid seeded crops, seed is metered from the tank into a distribution network of tubes and manifolds that divide the air stream eventually into a separate tube for each furrow opener. Sufficient seed is metered into the air stream to provide the desired seeding rate across the width of the air seeder. The distribution network is designed such that the air stream, and the seeds carried in the air stream, are divided substantially equally so that about the same amount of seed is delivered to each furrow opener, at least within a satisfactory range of variation.

The quantity of seed directed to each row will vary within a range that is considered acceptable, but still can be significant. There is also some degree of seed damage caused by the impact of seeds within the manifolds used to divide the air stream.

It is also known to meter seed from the tank directly into a separate tube for each furrow opener, and to carry the seed from the tank to the furrow opener with an air stream through each tube. Improved uniformity of seed distribution between rows, and reduced seed impact and resulting damage is thus achieved. Due to differences in individual seed friction within a tube, chance contacts within the delivery tube and air pulsing effects, the accurate metering rate will, however, not yield an even seed spacing when the seed exits the tube into the furrow even if the seed is singulated into the leading end of the tube.

Air seeders have also been developed for singulating seeds. Seed is pneumatically conveyed through tubes on demand to small secondary storage chambers above the individual furrow openers, and the seed in the secondary chambers is then metered to the furrow through a singulating mechanism. This type of distribution system is typical on newer row planters for corn, sunflowers, and the like. These singulating mechanisms are substantially the same as the conventional singulating mechanisms described above and have the same time consuming adjustment and clean out and also do not readily adapt to a variety of seed.

SUMMARY OF THE INVENTION

It is an object of the present invention to provide a seed feeding system with a feed assembly that overcomes problems in the prior art.

In a first embodiment the present invention provides a seed feeding apparatus. The seed feeding apparatus comprises a feed assembly comprising a first member having an outer rim and an inner face wherein at least a groove portion of the outer rim substantially forms an arc, and a second member adjacent to the inner face of the first member. The first and second members are configured such that a V-shaped groove is formed with walls provided by a portion of the second member and the groove portion of the outer rim of the first member. A drive is operative to move a driven member, comprising at least one of the first and second members, and a control is operative to control a speed of the driven member. A pocket is formed by the walls of the groove and by a pocket plate extending into the groove and configured to substantially conform to the groove. The pocket plate is located such that the driven member moves in a direction that moves seeds in the pocket up the arc of the groove portion of the outer rim. In operation the pocket is positioned to receive seeds from a seed supply system such that received seeds in the pocket are carried in the groove out of the pocket as the driven member moves.

In a second embodiment the present invention provides a seed distributing apparatus comprising an air distribution system operative to receive seeds from a metering device into an air stream and deliver received seeds through a seed tube to an air release chamber, the air release chamber configured to exhaust the air stream and drop the seeds onto an upper end of a sloped pocket plate such that the seeds slide down the pocket plate to a lower end thereof. A feed assembly is oriented to receive seeds from the lower end of the pocket plate. The feed assembly comprises a first member having an outer rim and an inner face wherein at least a groove portion of the outer rim substantially forms an arc of a circle, and a second member adjacent to the inner face of the first member. The first and second members are configured such that a V-shaped groove is formed with walls provided by a portion of the second member and the groove portion of the outer rim of the first member. A drive is operative to rotate a driven member, comprising at least one of the first and second members, about a rotational axis, and a control operative to control a rotational speed of the driven member. The pocket plate is oriented such that the lower end of the pocket plate is located below an upper edge of the groove and above the rotational axis such that the driven member moves upward adjacent to the lower end of the pocket plate, and wherein the lower end of the pocket plate extends into the V-shaped groove and is configured to substantially conform to the V-shaped groove such that a pocket is formed by the walls of the groove and the pocket plate, and such that seeds sliding down the pocket plate land in the pocket. As the driven member rotates, seeds fall from a pile of seeds in the pocket to a bottom of the groove with sides of the seeds bearing against the walls of the groove such that the seeds are aligned in single file along the bottom of the groove adjacent to each other, and as the driven member rotates the seeds move upward over the upper edge of the groove and then fall out of the groove one at a time into a furrow, and wherein the rotational speed of the driven member is selected to provide a desired spacing between seeds in the furrow.

In a third embodiment the present invention provides a method for feeding seed into a furrow. The method comprises metering a desired application rate of seeds into an input end of a seed tube, and conveying the seeds through the seed tube to a seed feeding apparatus operative to feed the seeds one at a time into a furrow with a desired interval between the seeds.

The V-shaped groove moving under the pile causes the seeds to naturally fall into the groove. As soon as there is room in the groove to accommodate the next seed, which occurs when a prior seed has moved away from the pile by a distance equal to the seed size, the next seed drops into the bottom of the groove and essentially touches the prior seed so that the seeds are equally spaced along the groove, the space being the width of the seed which is generally reasonably consistent for the purposes of the invention.

The V-shaped groove accommodates seeds of varying sizes, and the speed of the feed assembly can be adjusted so that seeds drop out of the groove at a rate that is substantially consistent, such that the space between the dropping seeds is substantially the same, and such that the spacing between seeds in the furrow where the seeds land is substantially the same. Varying the speed varies the seed spacing in the furrow so that a desired seed spacing, and thus a desired plant population can be obtained for a wide variety of seed sizes.

The invention provides a solution that is relatively simple and economical, and accommodates a wide variety of seed sizes without any changes to the mechanism. In addition to use with conventionally singulated seeds like corn and sunflower, it is contemplated that the apparatus could be used for seeding solid seeded crops such as canola and wheat, and thereby provide the benefits of uniform seed spacing in these crops. Also the same seeding implement could be used with a wider variety of seed sizes with little adjustment.

The invention also provides for separate metering and feeding operations. The seed can be metered into a seed tube for each furrow opener, and then received at the output end of the seed tube and fed one at a time into a furrow with a desired interval between the seeds. The seeds are aligned in the seed feeding apparatus in a row such that seeds are adjacent to each other with substantially no spaces between the seeds, and the row of seeds is advanced along the seed feeding apparatus such that seeds drop from the seed feeding apparatus into the furrow with the desired interval between the seeds. Conveniently the seeds are aligned in an upper portion of a substantially circular V-shaped groove, and the row of seeds is advanced along the seed feeding apparatus by moving at least one wall of the V-shaped groove such that the seeds drop out of the groove as the wall of the V-shaped groove moves.

The invention can allow the benefits of uniform seed spacing to be realized in smaller seeded crops such as wheat and canola that are generally solid seeded with no regard to singulating seeds to achieve uniform seed spacing in a furrow.

DESCRIPTION OF THE DRAWINGS

While the invention is claimed in the concluding portions hereof, preferred embodiments are provided in the accompanying detailed description which may be best understood in conjunction with the accompanying diagrams where like parts in each of the several diagrams are labeled with like numbers, and where:

DETAILED DESCRIPTION OF THE ILLUSTRATED EMBODIMENTS

Figure 1:
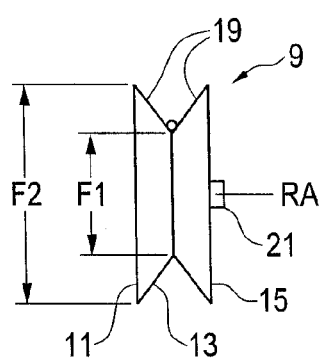
FIG. 1 is a schematic front view of an embodiment of a feed assembly of the present invention.
Figure 2:
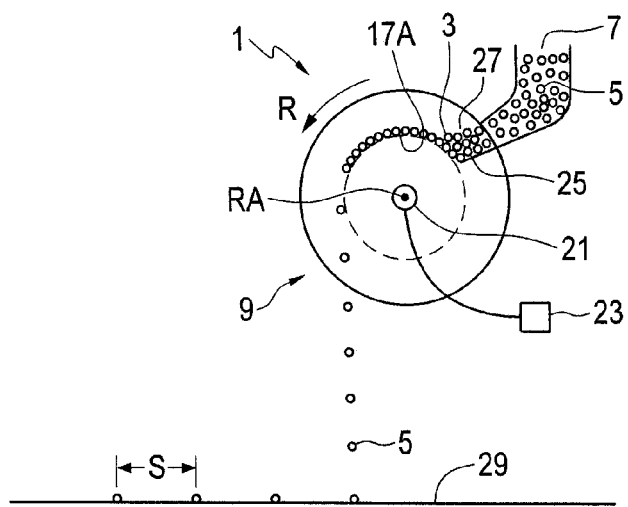
FIG. 2 is a schematic side view of an embodiment of a seed feeding apparatus of the present invention using the feed assembly of FIG. 1.

FIG. 2 schematically illustrates an embodiment of a seed feeding apparatus 1 of the present invention. The apparatus 1 comprises a pocket 3 configured to receive seeds 5 from a seed supply system 7. The seed supply system 7 could be a conventional system where seeds are received from a container above the furrow opener or an air distribution system.

A feed assembly 9 comprises a circular first member 11 having a diameter F1 at an inner face thereof that is smaller than the diameter F2 at the outer face thereof such that the outer rim 13 of the first member 11 slopes from the inner edge of the first member 11 toward the outer edge thereof. A second member 15 has an inner face located adjacent to the inner face of the first member 11 such that a substantially circular V-shaped groove 17 is formed with walls 19 provided by the outer rim 13 of the first member 11 and the second member 15.

A drive, such as a motor 21 powered by electricity, hydraulics, or the like, or a ground drive, is operative to rotate one of the first and second members 11, 15 about a substantially horizontal rotational axis RA through a center of the first member 11, and a control 23 is operative to control the rotational speed of the driven one of the first and second members 11, 15. In a typical implement with a plurality of furrow openers and a corresponding plurality of seed feeding apparatuses 1, the drives can be interconnected and controlled so that the rotational speed of a plurality of apparatuses, or all of them, can be controlled by one control.

Figure 3:
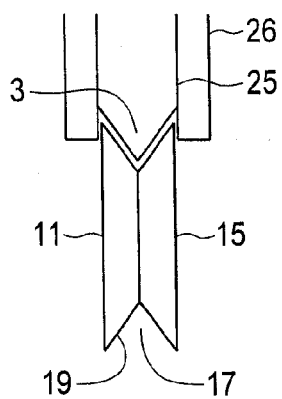
FIG. 3 is a schematic top view of the feed assembly of FIG. 1 and the pocket plate shown in FIG. 2.

The pocket 3 is formed by the walls 19 of the V-shaped groove 17 and a downward sloped pocket plate 25 extending into the groove 17 and configured to substantially conform to the V-shaped groove 17 as shown in FIG. 3 so that seeds 5 are prevented from falling down between walls 19 of the groove 17 and the pocket plate 25. The pocket plate 25 is located below an upper bottom edge 17A of the groove 17 and above the rotational axis RA such that the driven member 11, 15, rotating in direction R, moves upward adjacent to the pocket 3 and seeds 5 in the pocket 3 are carried in the groove 17 upward and out of the pocket 3 as the driven member 11, 15 rotates.

The seed supply system 7 is operated to drop the seeds 5 into the pocket 3 at a rate sufficient to substantially maintain a pile 27 of seeds 5 in the pocket 3. The seeds 5 are carried in the groove 17 upward and out of the pocket 3 as the driven member 11, 15 rotates. The pocket 3 will typically be located on an upper portion of the arc of the groove 17 where the groove starts to move substantially laterally as well as upward, such that the seeds can readily move laterally away from the pile 27.

Figure 5:
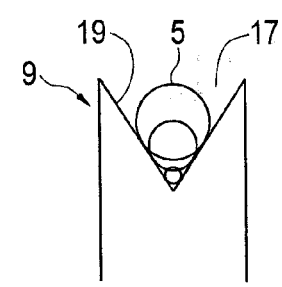
FIG. 5 is a schematic rear view of a feed assembly of FIG. 1 showing a variety of sizes of seeds accommodated in the groove.

As the driven member 11, 15 rotates, seeds 5 fall from the pile 27 of seeds 5 in the pocket 3 to the bottom of the groove 17 with sides of the seeds 5 bearing against the walls 19 of the groove 17, as seen in FIG. 5, such that the seeds 5 are aligned in single file along the bottom of the groove 17 adjacent to each other and essentially touching each other as schematically shown in FIG. 2. As the groove 17, or at least one wall 19 thereof, passes under the pile 27, the seeds 5 located where the groove 17 moves out from under the pile 27 naturally fall into the bottom of the groove 17 as illustrated.

As the driven member 11, 15 rotates the seeds 5 are carried in the groove 17 upward over the upper edge 17A of the groove 17 and then downward along the upper arc of the groove 17 until they reach a point where gravity draws them down out of the groove 17 and the seeds 5 then fall out of the groove 17 one at a time into a furrow 29 made by a seeding implement on which the apparatus 1 is installed.

It can be seen that with the seeds 5 arranged in the bottom of the groove 17 closely adjacent to, or likely in fact touching each other, as the driven member 11, 15 rotates at a constant speed, the seeds 5 will drop out of the groove 17 at a constant rate corresponding to the rotational speed so that the spacing S between seeds 5 in the furrow 29 will also be substantially constant. The spacing S is determined by the speed of travel along the ground, and by the rotational speed of the driven member 11, 15. For a given ground speed the rotational speed of the driven member 11, 15 is selected to provide a desired spacing S between seeds 5 in the furrow 29. The rotational speed will typically be coordinated to the ground speed as is well known in the art, such that as the ground speed varies the rotational speed varies as well to maintain the spacing S at the desired substantially constant spacing.

Figure 4:
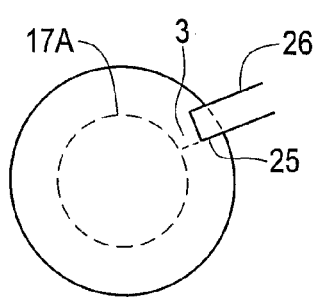
FIG. 4 is a schematic side view of the feed assembly and the pocket plate of FIG. 3.

FIG. 4 shows that the downward sloping pocket plate 25 and walls of the groove form a pocket 3. Pocket walls 26 extending upward from the pocket plate 25 enlarge a capacity of the pocket 3. FIG. 2 schematically shows an arrangement where what is essentially a spout directs seed from a container of seeds so that the pocket 3 is kept full of seeds, with seeds flowing from the spout to the pocket as seeds are removed from the pocket by the rotating feed assembly 9.

In the illustrated apparatus 1 the first and second members 11, 15 are connected such that the driven member comprises both the first and second members 11, 15. In the illustrated apparatus 1 the first and second members 11, 15 are in fact, as will commonly be satisfactory, provided by a single feed wheel defining the V-shaped groove 17 in the periphery thereof.

It is contemplated however that it will only be necessary to rotate one or the other of the members 11, 15 in order to provide the required function of drawing seeds 5 from the pile 27 into the groove 17. It is also contemplated that with one of the walls 19 moving and the other wall 19 either stationary or rotating at some other speed such that there is relative movement between the walls 19, seeds 5 may be separated more surely, such that the occurrence of clumps of seeds 5 being carried in the groove 17 is reduced.

It is also contemplated that one or both of the walls 19 of the groove 17 could be configured to increase friction between the seeds 5 and the walls 19, such that the seeds 5 are pulled more aggressively from the pile 27. Especially where there is relative movement between the walls 19, increasing the friction force between the seeds 5 and one of the walls 19 will exert a larger force on the seeds 5 to pull them apart and reduce the occurrence of clumps in the groove 17. The friction can be increased by roughening the walls 19, by making them of a relatively softer or resilient material, or by like methods known in the art.

FIG. 5 schematically illustrates the groove 17 with a various sizes of seeds 5 shown in the groove 17. It can be seen that the smallest seed rests near the bottom of the groove, while the larger seeds rest progressively higher in the groove 17, and that regardless of the seed size, all are supported by lower right and left sides of the seeds 5 bearing against corresponding right and left walls 19 of the groove 17. Thus the apparatus 1 of the invention will accommodate a broad size range of seeds without changing the feed assembly 9.

Figure 6:
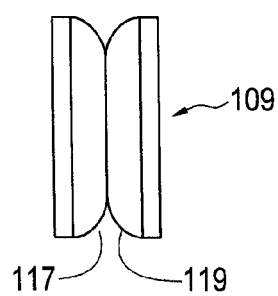
FIG. 6 is a schematic rear view of an alternative feed assembly of the present invention where walls of the groove are curved.

While the walls 19 of the groove 17 of the above described feed assembly 9 are flat, it is also contemplated that curved walls might be used in some applications. FIG. 6 illustrates an alternate feed assembly 109 wherein the walls 119 of the groove 117 are convexly curved, which may be desirable for certain contemplated seed varieties.

Figure 7:
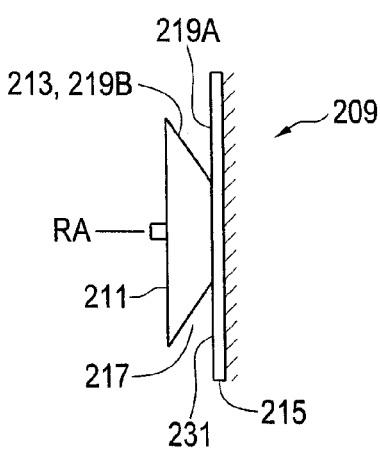
FIG. 7 is a schematic rear view of a further alternative feed assembly of the present invention where one wall of the V-shaped groove is provided by a stationary vertical surface.

FIG. 7 illustrates a further alternate feed assembly 209 wherein the second member 215 comprises a flat inner surface 231 oriented substantially perpendicular to the rotational axis RA such that a wall 219A of the groove 217 is provided by the flat inner surface 231 and the other wall 219B is provided by the periphery 213 of the first member 211. Either one of the first member 211 and second member 215 can be the driven member, with the other member stationary, or both could be driven.

Figure 8:
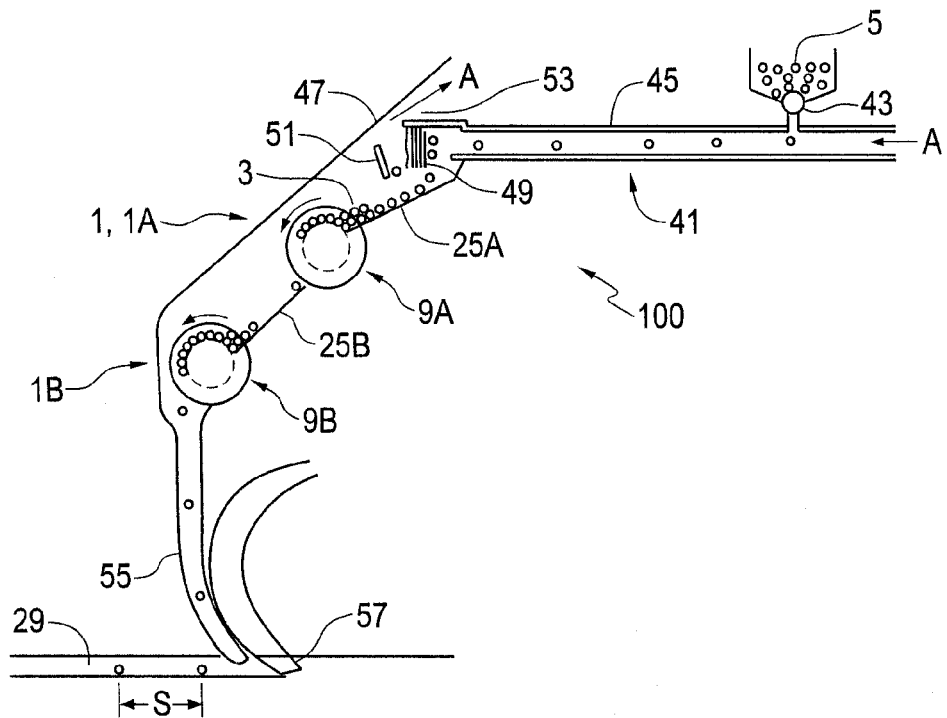
FIG. 8 is a schematic side view of an embodiment of a seed distributing apparatus of the present invention incorporating upper and lower seed feeding apparatuses as shown in FIG. 1.

FIG. 8 schematically illustrates a seed distributing apparatus 100 of the present invention that includes upper and lower seed feeding apparatuses 1A, 1B. The apparatus 100 comprises an air distribution system 41 operative to receive seeds 5 from a metering device 43 into an air stream A and deliver received seeds 5 through a seed tube 45 to an air release chamber 47. The air release chamber 47 is configured to exhaust the air stream A. In the illustrated apparatus 100, the air stream A carrying seeds 5 enters the air release chamber 47 where the seeds 5 contact bristles 49 and then drop onto an upper end of a sloped pocket plate 25A such that the seeds 5 slide down the pocket plate 25A to a lower end thereof. If any seeds pass through the bristles 49, they will contact a baffle 51 and drop onto the pocket plate 25A. The air stream A exhausts through an opening 53 in the top of the chamber 47.

The feed assembly 9A of the first seed feeding apparatus 1A receives the seeds as described above, and drops them onto the lower pocket plate 25B of the lower seed feeding apparatus 1B, which is configured to receive seeds from the upper feed assembly 9A at an upper end thereof. The lower feed assembly 9B is oriented to receive seeds 5 from a lower end of the lower pocket plate 25B. The lower feed assembly 9B operates in the same manner as described above to deliver seeds 5 into a furrow opener tube 55 and into the furrow 29 made by the furrow opener 57 such that the seeds are spaced at a substantially constant distance S from one another. It is contemplated that with some types of seed, passing the seeds through two separate seed feeding apparatuses 1A, 1B will further reduce clumping in the groove of the lower feed assembly 9b and improve uniformity of spacing.

In the illustrated air distribution system 41, a single tube 45 conveys seed from the metering device 43 directly to an air release chamber 47 above each furrow opener 57 on a seeding implement. Thus the seed for each furrow on the seeding implement is separately metered and delivered to each furrow opener where it is received by the upper seed feeding apparatus 1A. It is contemplated that an air distribution system of the type where seeds are metered into an initial air stream that is divided downstream could also be used, however the spacing will likely be less uniform because of the variations in distribution of seeds through the manifolds of the system.

It is contemplated that during initial startup of an implement using the air distribution apparatus 41, the air distribution system will be operated for a short time prior to moving forward, or operated with an initial surge, or in some other manner to build up a small pile 27 of seeds 5 in the pocket 3. The removal of seeds from the pocket is carried out as described above, and is substantially a constant number of seeds per foot of furrow. The rate of input of seeds into the pocket 3 will however vary within a range as discussed above, depending on the type of seed supply system used. Thus the size of the pile 27 of seeds 5 in the pocket 3 will get bigger and smaller as the rate of input of seeds into the pocket 3 varies.

Figure 9:
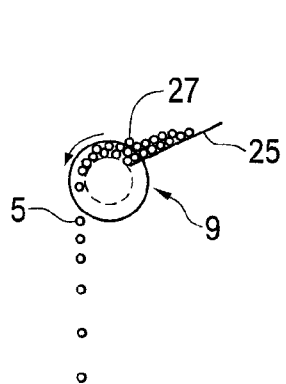
FIG. 9 is a schematic side view of the seed feeding apparatus of FIG. 2 showing the operation when the rate of input of seeds into the pocket is greater than the rate of removing seeds from the pocket, such that seeds spill over the top of the groove.

If the pile 27 gets big enough, seeds from the pile 27 may push seeds 5 along the groove 17 such that the seeds 5 slide along the groove 17 with respect to the walls 19 and thus exit the apparatus 101 faster than the wheel is turning, or the seeds 5 can also spill over the top of the groove 17 as schematically illustrated in FIG. 9. In any event jamming of seeds 5 is prevented by providing access over the grove so the seeds can spill out if necessary. The seeds 5 then drop from the feed assembly 9 at a higher rate than desired. When the rate of input of seeds 5 into the pocket 3 varies downward, the pile will diminish and the desired rate will again be attained.

Figure 10:
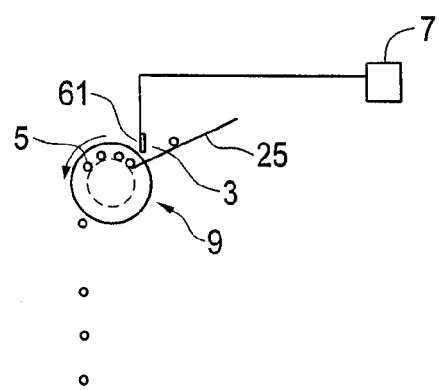
FIG. 10 is a schematic side view of the seed feeding apparatus of FIG. 2 showing the operation when the rate of input of seeds into the pocket is less than the rate of removing seeds from the pocket, such the pile is empty and seeds are spaced along the groove.

Similarly if the rate of input of seeds 5 into the pocket 3 varies downward such that the pile 27 diminishes to virtually no seeds, the seeds 5 will be carried out of the pocket 3 one at a time with some distance between them, as illustrated in FIG. 10, and the seeds 5 that drop from the feed assembly 9 will drop at a lower rate than the desired rate. When the rate of input of seeds 5 into the pocket 3 varies upward, the pile will be replenished and the desired rate will again be attained.

It will typically be desirable to make the pocket 3 large enough to provide some surge capacity such that the pile 27 can be maintained at a size that is not so great that seeds spill over, or so small that the groove 17 is not kept full. For example the apparatus 1 in FIG. 2 is fed with a spout so the pile is constantly replenished. Also as illustrated in FIGS. 3 and 4 pocket walls 26 can be provided to enlarge the pocket 3.

In any event when the seeds either spill over or the pocket becomes empty, seeding can still proceed with about the desired seeding rate maintained to provide satisfactory crop performance. Only the optimum yields attributable to uniform seed spacing will be sacrificed.

It is contemplated that a sensor 61, as schematically illustrated in FIG. 10, can be provided that is operative to monitor a size of the pile 27 of seeds 5 and operative to send a sensor signal to the seed supply system 7 to vary a rate of delivery of seeds 5 to the pocket plate 25 such that the size of the pile 27 is maintained within a desired size range. Alternatively where it is desired to maintain the metering rate into the pocket 3 constant the rotational speed of the driven member of the feed assembly 9 can be varied to maintain the size of the pile 27 within the desired size range. A camera could be provided to view the operation to facilitate adjustment of the rate of input of seeds. The technology is also available to detect individual seeds in an air stream or as they fall from the apparatus 1. Adjustments could be made based on this information as well.

Clean out when changing from one type of seed to another can typically be accomplished by rotating the feed assembly 9 after stopping the input of seeds to thereby diminish the pile to substantially no seeds. Access ports can be provided to allow inspection where it is desired to confirm that there are no seeds remaining in the pocket 3, and to allow removal of any seeds or other matter that may be stuck in the groove 17 or pocket.

Figure 11:
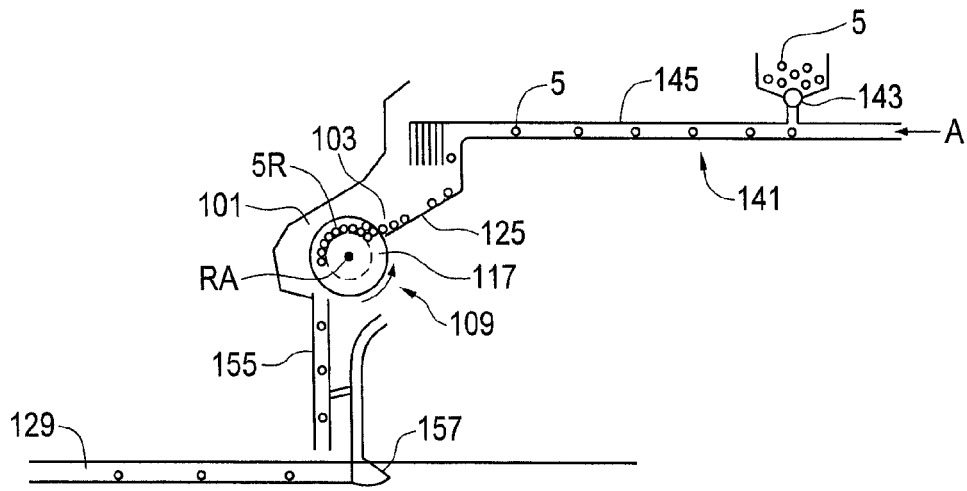
FIG. 11 is a schematic side view of an embodiment of an apparatus of the invention illustrated to show a method of the present invention.

Thus a method of the invention for feeding seed into a furrow 129, as schematically illustrated in FIG. 11, comprises with metering a desired application rate of seeds into an input end of a seed tube 145. As illustrated, a meter 143 meters seed from the seed bin of an air seeder into a air stream A directed through the seed tube 145. A separate tube and meter is provided for each furrow opener 157 and the desired rate is fed into each seed tube 145. As the seed 5 passes through the seed tube 145 it bounces off the walls of the tube 145 and each seed 5 experiences different contacts and so the seeds do not arrive at the output end of the tube 145 at the same intervals as they were fed into the input end of the tube. The seed 5 is received at the output end of the tube 145 by a seed feeding apparatus 101 which feeds the seeds 5 one at a time into a furrow 129 with a desired interval between the seeds 5. As described above the interval will determine the spacing between the seeds in the furrow at a constant forward speed.

As described above the illustrated method further comprises aligning seeds 5 in the seed feeding apparatus 101 in a row 5R such that seeds 5 are adjacent to each other with substantially no spaces between the seeds 5, and advancing the row 5R of seeds 5 along the seed feeding apparatus 101 such that seeds drop from the seed feeding apparatus 101 into the furrow 129 with the desired interval between the seeds. The seeds 5 are aligned in an upper portion, as illustrated, of a substantially circular portion of V-shaped groove 117. The row 5R of seeds 5 is advanced along the seed feeding apparatus 101 by moving at least one wall of the groove 117 such that the seeds 5 are moved upward along the groove 117 and over a top of the circular portion of the groove 117 and drop out of the groove 117 when the arc of the circular portion of the groove curves downward to point where the seeds drop. The seeds 5 fall out of the groove 117 one at a time into a tube 155 and through the tube 155 into the furrow 129. Controlling a rotational speed of the feed assembly 9 provides a desired spacing between seeds 5 in the furrow 29.

In the embodiment of FIG. 11, the metering of seed takes place before the seed enters the seed tube 145, and the seed feeding apparatus 101 only singulates the seed as it arrives. If the seeds arrive faster than they are dropped into the furrow, the pile will grow and seeds from the pile may push the row of seeds along the groove such that the seeds slide along the groove with respect to the walls and thus exit the apparatus 101 faster than the wheel is turning, or can spill over the top of the groove 117 to prevent jamming the apparatus. Similarly as described above if the seed is dropped out of the apparatus 101 faster than it arrives the seeds will not be closely adjacent to each other in the row 5R and the distance between seeds in the furrow will increase as described above.

Figure 12:
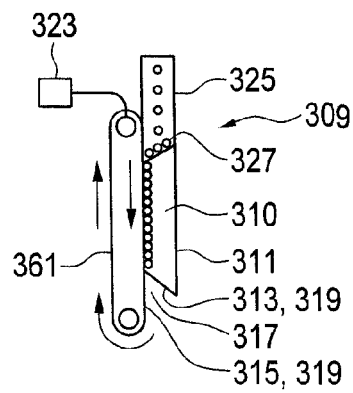
FIG. 12 is a schematic top view of an alternate embodiment of a feed assembly of the present invention where a flat belt moves and where the arced member of the groove is stationary.
Figure 13:
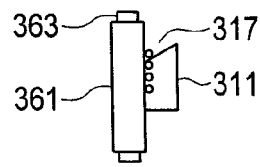
FIG. 13 is a schematic front view of the embodiment of FIG. 12.
Figure 14:
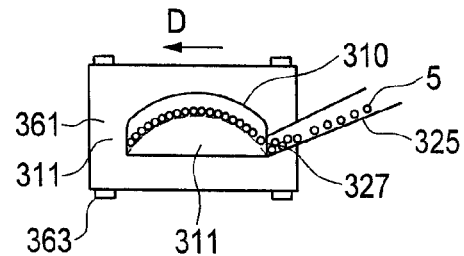
FIG. 14 is a schematic side view of the embodiment of FIG. 12.

The embodiments above conveniently use a rotating wheel to provide the movement of at least one wall of the groove that is required to move the seeds along the groove. FIGS. 12-14 schematically illustrate an embodiment of a feed assembly 309 of the present invention where only a portion of a wheel is used, and where that wheel portion is stationary.

As in the embodiments above, feed assembly 309 comprises a first member 311 having an outer rim 313 and an inner face, wherein only a top groove portion 310 of the outer rim 313 substantially forms an arc. A second member 315 is positioned adjacent to the inner face of the first member 311 and the members 311, 315 are configured such that a V-shaped groove 317 is formed with walls 319 provided by some portion or part of the second member 315 and the groove portion 310 of the outer rim 313 of the first member 311.

In the embodiments above, at least one of the first and second members is circular, but in the feed assembly 309 the first member has only a top groove portion thereof that substantially forms an arc, and the first member 311 is stationary, while the second member 315 moves. It is not strictly necessary that the arc be a circular arc, and it may be that performance could be improved by providing a hyperbolic or other shape for the arc. What is required conceptually is that the groove be V-shaped to accommodate a variety of seed diameters, and that it rises from the pocket 403 in an arc that then reaches a maximum and then arcs downward.

A pocket 327 is formed by the walls 319 of the groove 317 and by a pocket plate 325 extending into the groove 317 and configured to substantially conform to the groove 317. The pocket plate 317 is located such that the driven member moves in a direction that moves seeds 5 in the pocket 327 up the arc of the groove portion 310 of the outer rim 313.

The second member 315 is provided by a flat belt, 361. A drive rotates the pulleys 363 on which the belt 361 is mounted such that the inner surface of the belt 361, which forms one wall of the groove 317, and is the driven member, moves in a direction D that moves seeds in the pocket up the arc of the groove portion 310 of the outer rim 313. A control 323 is operative to control the speed of the belt 361.

In operation the pocket 327 is positioned to receive seeds 5 from a seed supply system such that received seeds 5 in the pocket are carried in the groove 317 out of the pocket as the belt 361 moves in direction D.

Figure 16:
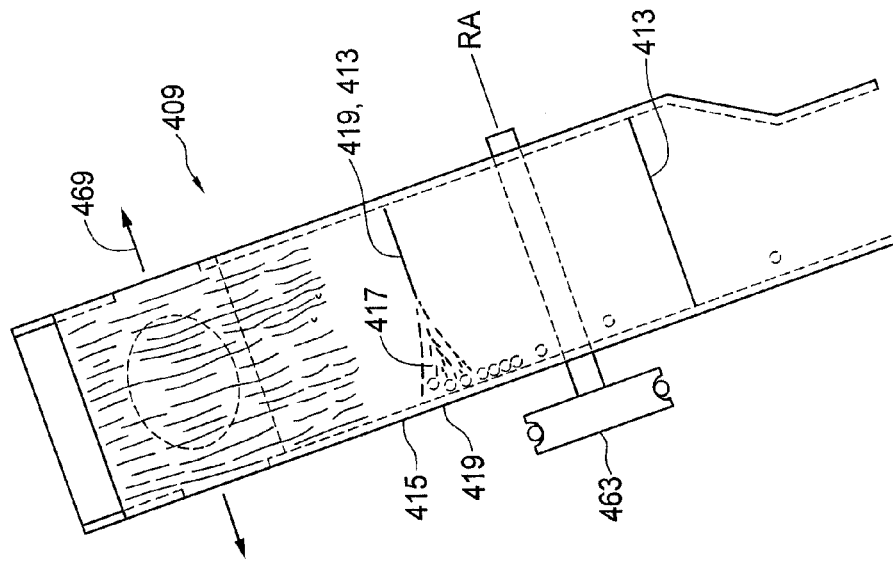
FIG. 16 is a schematic rear view of the embodiment of FIG. 15.
Figure 15:
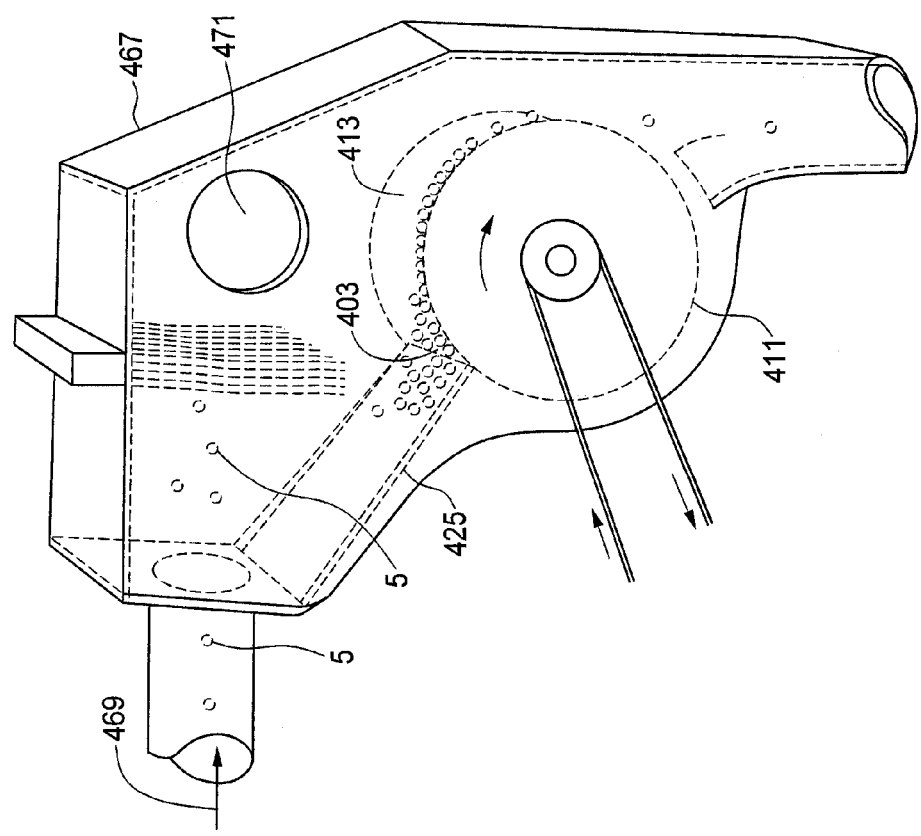
FIG. 15 is a schematic perspective view of an alternate feed assembly of the present invention.

The embodiments above illustrated in FIGS. 1-11 conveniently use a wheel with a sloped outer rim providing one wall of the groove, where the rotational axis is horizontal. FIGS. 15 and 16 illustrate an embodiment of a feed assembly 409 of the present invention where the outer rim of the wheel is not sloped, but where instead the rotational axis is sloped upward such that the outer rim of the wheel is inclined up from the horizontal.

As in the embodiments above, the feed assembly 409 comprises a first member 411 having an outer rim 413 and an inner face wherein at least a groove portion of the outer rim substantially forms an arc. In the illustrated embodiment the first member comprises a substantially circular disc 411. The outer rim is provided by an outer wall 413 of the disc, and the inner face is provided by a substantially flat end of the disc.

The second member adjacent to the inner face of the first member 411 comprises a groove plate 415, and a surface of the groove plate 415 is located adjacent to the inner face of the disc 411 such that the surface of the groove plate 415 provides a first wall 419 of the V-shaped groove 417 and the outer wall 413 of the disc 411 provides a second wall 419 of the groove 417.

The circular disc 411 is tilted such that the outer rim 413 is oriented at an upward angle to the horizontal and the disc 411 rotates about a rotational axis RA through the center of the disc 411 oriented at an upward angle to the horizontal. The outer rim 413 and groove plate 415 both slope upward from the bottom of the groove 417, forming a groove that is oriented as required so seeds fall to the bottom of the groove in single file.

A drive is operative to rotate the pulley 463 and rotate the disc 411 at the selected speed.

A pocket 403 formed by the walls 419 of the groove 417 and by a pocket plate 425 extending into the groove 417 and configured to substantially conform to the groove 417. The pocket plate 425 is located such that the disc 411 moves in a direction that moves seeds 5 in the pocket 403 up the arc of the outer rim 413.

The groove plate 415 conveniently forms a side wall of a chamber 467 for receiving seeds 5 from the seed supply system 407. The chamber 467 is configured as an air release chamber to receive an air stream 469 carrying seeds 5 and exhaust the air stream 469 through holes 471 and drop the seeds 5 onto the pocket plate 425. The pocket plate 425 is sloped such that seeds 5 dropping onto the pocket plate 425 slide down the pocket plate into the pocket 403.

The embodiment of FIGS. 15 and 16 is conveniently made by fashioning the chamber 467 with walls perpendicular to the rotational axis RA as illustrated, and then tilting the whole apparatus 401 so the side wall of the chamber and outer rim 413 of the disc 411 form a groove with walls inclined upward from the of the groove 417.

The foregoing is considered as illustrative only of the principles of the invention. Further, since numerous changes and modifications will readily occur to those skilled in the art, it is not desired to limit the invention to the exact construction and operation shown and described, and accordingly, all such suitable changes or modifications in structure or operation which may be resorted to are intended to fall within the scope of the claimed invention.

What is claimed is:

1. A seed feeding apparatus comprising:
    a feed assembly comprising:
        a first member having an outer rim and an inner face wherein at least a groove portion of the outer rim substantially forms an arc;
        a second member adjacent to the inner face of the first member;
        wherein the first and second members are configured such that a V-shaped groove is formed with walls provided by a portion of the second member and the groove portion of the outer rim of the first member;
    a drive operative to move a driven member, comprising at least one of the first and second members, and a control operative to control a speed of the driven member;
    a pocket formed by the walls of the groove and by a pocket plate extending into the groove and configured to substantially conform to the groove, wherein the pocket plate is located such that the driven member moves in a direction that moves seeds in the pocket up the arc of the groove portion of the outer rim;
    wherein operation the pocket is positioned to receive seeds from a seed supply system such that received seeds in the pocket are carried in the groove out of the pocket as the driven member moves;
    wherein received seeds form a pile of seeds in the pocket and as the driven member moves, seeds fall from the pile of seeds to a bottom of the groove with sides of the seeds bearing against the walls of the groove such that the seeds are aligned in single file along the bottom of the groove adjacent to each other, and as the driven member moves the seeds move upward over an upper edge of the groove and then fall out of the groove one at a time into a furrow, and wherein the speed of the driven member is selected to provide a desired spacing between seeds in the furrow;
    and wherein:
        the first member comprises a substantially circular disc, wherein the outer rim thereof is provided by an outer wall of the disc, and the inner face thereof is provided by a substantially flat end of the disc;
        the second member comprises a groove plate, and wherein a surface of the groove plate is located adjacent to the inner face of the first member such that the surface of the groove plate provides a first wall of the V-shaped groove and the outer wall of the disc provides a second wall of the V-shaped groove;
        the circular disc is tilted such that the outer rim is oriented at an upward angle to the horizontal; and
        at least one of the first and second members rotates about a rotational axis oriented at an upward angle to the horizontal.

2. The apparatus of claim 1 wherein the groove plate forms a side wall of a chamber for receiving seeds from the seed supply system, and wherein the rotational axis extends through the center of the cylindrical disc and the cylindrical disc is driven about the rotational axis.

3. The apparatus of claim 2 wherein the chamber is configured as an air release chamber to receive an air stream carrying seeds and exhaust the air stream and drop the seeds onto the pocket plate, and wherein the pocket plate is sloped such that seeds dropping onto the pocket plate slide down the pocket plate into the pocket.

4. A seed feeding apparatus comprising:
    a feed assembly comprising:
        a first member having an outer rim and an inner face wherein at least a groove portion of the outer rim substantially forms an arc;
        a second member adjacent to the inner face of the first member;
        wherein the first and second members are configured such that a V-shaped groove is formed with walls provided by a portion of the second member and the groove portion of the outer rim of the first member;
    a drive operative to move a driven member, comprising at least one of the first and second members, and a control operative to control a speed of the driven member;
    a pocket formed by the walls of the groove and by a pocket plate extending into the groove and configured to substantially conform to the groove, wherein the pocket plate is located such that the driven member moves in a direction that moves seeds in the pocket up the arc of the groove portion of the outer rim;
    wherein operation the pocket is positioned to receive seeds from a seed supply system such that received seeds in the pocket are carried in the groove out of the pocket as the driven member moves;
    wherein received seeds form a pile of seeds in the pocket and as the driven member moves, seeds fall from the pile of seeds to a bottom of the groove with sides of the seeds bearing against the walls of the groove such that the seeds are aligned in single file along the bottom of the groove adjacent to each other, and as the driven member moves the seeds move upward over an upper edge of the groove and then fall out of the groove one at a time into a furrow, and wherein the speed of the driven member is selected to provide a desired spacing between seeds in the furrow; and
    a sensor operative to monitor a size of the pile of seeds and operative to send a sensor signal to the seed supply system to vary a rate of delivery of seeds to the pocket plate such that the size of the pile is maintained within a desired size range.

5. The apparatus of claim 4 wherein at least one of the walls of the groove is configured to increase friction between the seeds and the at least one wall.

6. The apparatus of claim 4 further comprising pocket wails extending upward from the pocket plate to enlarge a capacity of the pocket.

7. The apparatus of claim 4 wherein at least one of the walls of the groove is curved.

8. The apparatus of claim 4 wherein at least one of the walls of the groove is flat.

9. A seed distributing apparatus comprising:
an air distribution system operative to receive seeds from a metering device into an air stream and deliver received seeds through a seed tube to an air release chamber, the air release chamber configured to exhaust the air stream and drop the seeds onto an upper end of a sloped pocket plate such that the seeds slide down the pocket plate to a lower end thereof;
a feed assembly oriented to receive seeds from the lower end of the pocket plate, the feed assembly comprising:
a first member having an outer rim and an inner face wherein at least a groove portion of the outer rim substantial) forms an arc of a circle;
a second member adjacent to the inner face of the first member;
wherein the first and second members are configured such that a V-shaped groove is formed with walls provided by a portion of the second member and the groove portion of the outer rim of the first member;
a drive operative to rotate a driven member, comprising at least one of the first and second members, about a rotational axis, and a control operative to control a rotational speed of the driven member;
wherein the pocket plate is oriented such that the lower end of the pocket plate is located below an upper edge of the groove and above the rotational axis such that the driven member moves upward adjacent to the lower end of the pocket plate, and wherein the lower end of the pocket plate extends into the V-shaped groove and is configured to substantially conform to the V-shaped groove such that a pocket is formed by the walls of the groove and the pocket plate, and such that seeds sliding down the pocket plate land in the pocket; and
wherein as the driven member rotates, seeds fall from a pile of seeds in the pocket to a bottom of the groove with sides of the seeds bearing against the walls of the groove such that the seeds are aligned in single file along the bottom of the groove adjacent to each other, and as the driven member rotates the seeds move upward over the upper edge of the groove and then fall out of the groove one at a time into a furrow, and wherein the rotational speed of the driven member is selected to provide a desired spacing between seeds in the furrow;
and wherein:
the first member comprises a substantially circular disc, wherein the outer rim thereof is provided by an outer wall of the disc, and the inner face thereof is provided by a substantially flat end of the disc;
the second member comprises a groove plate, and wherein a surface of the groove plate is located adjacent to the inner face of the first member such that the surface of the groove plate provides a first wall of the V-shaped groove and the outer wall of the disc provides a second wall of the V-shaped groove;
the rotational axis is inclined at an upward angle to the horizontal; and
at least one of the first and second members rotates about the rotational axis.

10. The apparatus of claim 9 wherein the groove plate forms a side wall of a chamber for receiving seeds from the seed supply system, and wherein the rotational axis extends through the center of the cylindrical disc and the cylindrical disc is driven about the rotational axis.

11. The apparatus of claim 10 wherein the chamber is configured as an air release chamber to receive an air stream carrying seeds and exhaust the air stream and drop the seeds onto the pocket plate, and wherein the pocket plate is sloped such that seeds dropping onto the pocket plate slide down the pocket plate into the pocket.

12. The apparatus of claim 9 wherein at least one of the walls of the groove is configured to increase friction between the seeds and the at least one wall.

13. The apparatus of claim 9 wherein the air distribution system comprises a single tube from the metering device to the air release chamber.

14. A seed distributing apparatus comprising:
an air distribution system operative to receive seeds from a metering device into an air stream and deliver received seeds through a seed tube to an air release chamber, the air release chamber configured to exhaust the air stream and drop the seeds onto an upper end of a sloped pocket plate such that the seeds slide down the pocket plate to a lower end thereof;
a feed assembly oriented to receive seeds from the lower end of the pocket plate, the feed assembly comprising:
a first member having an outer rim and an inner face wherein at least a groove portion of the outer rim substantially forms an arc of a circle;
a second member adjacent to the inner face of the first member;
wherein the first and second members are configured such that a V-shaped groove is formed with walls provided by a portion of the second member and the groove portion of the outer rim of the first member;
a drive operative to rotate a driven member, comprising at least one of the first and second members, about a rotational axis, and a control operative to control a rotational speed of the driven member;
wherein the pocket plate is oriented such that the lower end of the pocket plate is located below an upper edge of the groove and above the rotational axis such that the driven member moves upward adjacent to the lower end of the pocket plate, and wherein the lower end of the pocket plate extends into the V-shaped groove and is configured to substantially conform to the V-shaped groove such that a pocket is formed by the walls of the groove and the pocket plate, and such that seeds sliding down the pocket plate land in the pocket;
wherein as the driven member rotates, seeds fall from a pile of seeds in the pocket to a bottom of the groove with sides of the seeds bearing against the walls of the groove such that the seeds are aligned in single file along the bottom of the groove adjacent to each other, and as the driven member rotates the seeds move upward over the upper edge of the groove and then fall out of the groove one at a time into a furrow, and wherein the rotational speed of the driven member is selected to provide a desired spacing between seeds in the furrow; and
a sensor operative to monitor a size of the pile of seeds and operative to send a sensor signal to the seed supply system to vary a rate of delivery of seeds to the pocket plate such that the size of the pile is maintained within a desired size range.

* * * * *